United States Patent
McColloch et al.

(10) Patent No.: US 8,974,125 B2
(45) Date of Patent: Mar. 10, 2015

(54) AIR-COOLED OPTICAL TRANSCEIVER MODULE SYSTEM

(75) Inventors: Laurence R. McColloch, Santa Clara, CA (US); David J. K. Meadowcroft, San Jose, CA (US); Paul Yu, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 86 days.

(21) Appl. No.: 13/595,784

(22) Filed: Aug. 27, 2012

(65) Prior Publication Data

US 2014/0056592 A1 Feb. 27, 2014

(51) Int. Cl.
*G02B 6/36* (2006.01)
*H04B 10/00* (2013.01)
*H04B 10/40* (2013.01)

(52) U.S. Cl.
CPC ...................................... *H04B 10/40* (2013.01)
USPC ............. 385/92; 398/135; 398/138; 361/676; 361/692; 361/831

(58) Field of Classification Search
USPC .............. 385/88–94, 139; 398/135, 138, 139; 372/34; 361/676, 688, 690, 692, 831
See application file for complete search history.

(56) References Cited

U.S. PATENT DOCUMENTS

| 6,556,811 | B1 | 4/2003 | Sayers et al. |
| 6,667,883 | B1 | 12/2003 | Solis et al. |
| 7,073,960 | B2 | 7/2006 | Anderl et al. |
| 7,167,363 | B1 * | 1/2007 | Cushman et al. ............. 361/694 |
| 7,317,617 | B2 * | 1/2008 | Meadowcroft et al. ........ 361/715 |
| 7,637,672 | B1 | 12/2009 | Li et al. |
| 7,898,808 | B2 * | 3/2011 | Joiner et al. ................... 361/707 |
| 8,773,852 | B2 * | 7/2014 | Singleton ...................... 361/690 |
| 2003/0053768 | A1 | 3/2003 | Brezina et al. |
| 2011/0164382 | A1 * | 7/2011 | Pirillis ........................... 361/690 |
| 2012/0182688 | A1 * | 7/2012 | McColloch et al. ........... 361/692 |

FOREIGN PATENT DOCUMENTS

GB 2419469 A * 4/2006 ............... H05K 7/20

* cited by examiner

*Primary Examiner* — Daniel Petkovsek (57) ABSTRACT

In an opto-electronic system having one or more optical transceiver modules and an enclosure, air is forced through the interior of the transceiver module to dissipate heat generated by the opto-electronic and electronic elements.

14 Claims, 12 Drawing Sheets

AIR-COOLED OPTICAL TRANSCEIVER MODULE SYSTEM

BACKGROUND

In an optical communication system, it is typically necessary to couple an optical fiber to an opto-electronic transmitter, receiver or transceiver device and to, in turn, couple the device to an electronic system such as a switching system or processing system. These connections can be facilitated by modularizing the transceiver device. Various transceiver module configurations are known. For example, the optical transceiver module 10 illustrated in FIG. 1 has a standard configuration or form commonly referred to as a Small Form Factor (SFF) or SFF-Pluggable (SFP) format. Transceiver module 10 includes a metallic module housing 12 in which are housed opto-electronic elements, optical elements, and electronic elements, such as one or more light sources (e.g., lasers), light sensors, lenses and other optics, digital signal driver and receiver circuits, etc. The front end or nose 14 of transceiver module 10 further includes a transmitter receptacle 16 and a receiver receptacle 18 into which optical fiber cables (not shown) are pluggable. The optical cable plug or connector body (not shown) can be of the standard type known as an LC connector, which has a substantially square profile corresponding to the shape of receptacles 16 and 18. Although not shown in FIG. 1 for purposes of clarity, transceiver module 10 can be plugged into a bay in the chassis or cage of an electronic system by inserting the rear end of transceiver module 10 into a bay opening in the cage and latching transceiver module 10 in place. A bail latch 20 facilitates latching transceiver module 10 and, when flipped to an extended position (not shown), serves as a handle by which a person can grip transceiver 10 to extract it from the cage.

Figure 1:
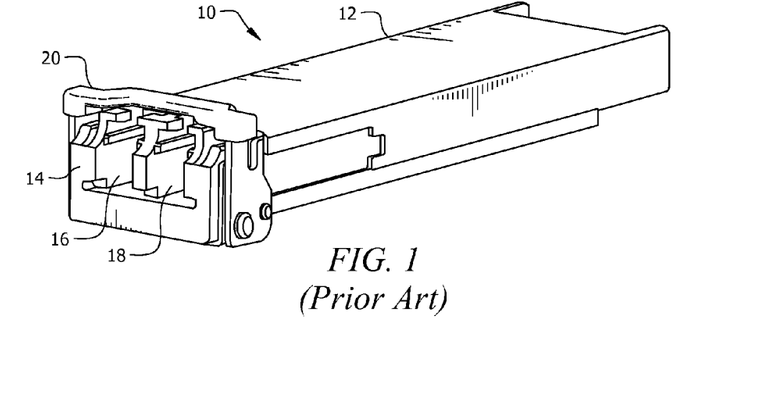
FIG. 1 is a perspective view of an optical transceiver module in accordance with the prior art.

Transceiver module cooling is a concern in the art. When transceiver 10 is plugged into a cage bay, the metallic module housing 12 is in contact with metallic walls of the cage bay. The heat emitted by the electronics and opto-electronics in transceiver module 10 in operation is commonly conducted away from transceiver module 10 by the metal walls of the cage bay. Heat sinks can be included in the cage to help dissipate the conducted heat. The cage is commonly mounted within a larger box-like enclosure containing electronics with which the plugged-in transceiver module 10 communicates electrical signals when in operation.

SUMMARY

Embodiments of the present invention relate to an optical transceiver module system and method of operation in which a flow of air through the interior of the transceiver module dissipates heat generated by the opto-electronic and electronic elements. In an exemplary embodiment, an optical transceiver module system comprises an enclosure, a cooling fan in the enclosure, and at least one transceiver module plugged into one of the enclosure bays. The bays have an elongated shape corresponding to that of the transceiver. Each bay extends substantially along a longitudinal axis and has a bay electrical connector at the end opposite that into which the transceiver module is plugged. The cooling fan is configured to convey air in a direction corresponding to (e.g., parallel or substantially parallel to) the longitudinal axis. The transceiver module extends between a nose end and a tail end in a direction corresponding to the longitudinal axis. The transceiver module includes a transceiver module housing assembly, an electronics subassembly, and an optics subsystem. The electronics subassembly includes a light source and a substrate. The substrate, which can be, for example, a printed circuit board, has a number of signal conductors, such as, for example, circuit traces. Accordingly, the substrate has a generally planar shape elongated in the direction corresponding to the longitudinal axis. The electronics subassembly mates with the bay electrical connector of the bay into which the transceiver module is plugged. The transceiver module housing assembly has a substantially rectangular profile and extends in a longitudinal direction between the nose end and the tail end of the transceiver module. The transceiver module housing assembly has at least one optical receptacle disposed at the nose end for receiving a fiber-optic cable plug connector. The optics subsystem is configured to redirect an optical beam between the light source and the optical receptacle. The transceiver module housing assembly has a first airflow opening and a second airflow opening separated or spaced apart in a direction corresponding to the longitudinal axis by an interior cavity portion of the transceiver module housing. The light source is mounted in the interior cavity portion between the first airflow opening and the second airflow opening.

An exemplary method of operation comprises providing the above-referenced enclosure and transceiver module, and inserting the transceiver module into one of the bays such that the electronics subassembly mates with the bay electrical connector and the electronics subassembly is configured to receive electrical signals via the bay electrical connector. A fiber-optic cable connector is connected to an optical receptacle at the nose end of the transceiver module. The light source is activated in response to the electrical signals and, as a result, generates not only an optical beam but also heat. The cooling fan conveys a flow of air into the first airflow opening in the transceiver module housing. The flow of air passes through the interior cavity portion of the transceiver module housing assembly in a direction corresponding to the longitudinal axis and passes the light source, from which the air flow picks up excess heat. The heated flow of air then exits the transceiver module housing through the second airflow opening.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 2:
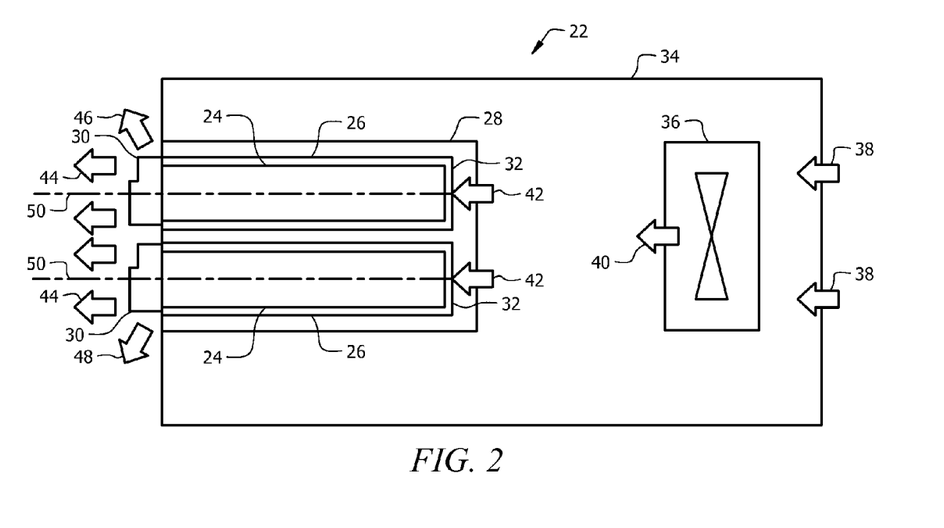
FIG. 2 is a schematic illustration of an optical transceiver module system in accordance with exemplary embodiments of the invention.

As illustrated in FIG. 2, in an illustrative or exemplary embodiment of the invention, a transceiver module system 22 comprises or includes one or more transceiver modules 24 that are plugged into one or more corresponding module bays 26 of a module cage 28. The forward ends or nose ends 30 of transceiver modules 24 extend outside of module cage 28 when transceiver modules 24 are fully plugged in to module cage 28. Although not shown in FIG. 2 for purposes of clarity, each rearward or tail end 32 of a transceiver module 24 electrically and mechanically mates with an electrical connector in the module bay 26 into which it is plugged. As used herein for reference purposes, the term "forward" means closer to nose end 30 than to tail end 32, and the term "rearward" means closer to tail end 32 than to nose end 30. Transceiver modules 24 have substantially rectangular exterior profiles that correspond to the substantially rectangular interior profiles of the module bays 26 that receive transceiver modules 24, thereby providing a snug fit of each transceiver module 24 within a module bay 26. Transceiver modules 24 can be inserted into module bays 26 and removed from module bays 26 in an essentially conventional manner. As persons skilled in the art understand how transceiver modules 24 can be plugged in and removed, such details are not further described herein for purposes of clarity.

Module cage 28 is mounted within an outer enclosure 34. Although not shown for purposes of clarity, outer enclosure 34 encloses an electronic system with which transceiver modules 24 are interfaced by virtue of being plugged into module cage 28. That is, electrical signals are communicated between transceiver modules 24 and such an electronic system via the above-referenced electrical connectors (not shown in FIG. 2) in the module bays 26.

A cooling fan 36 is mounted within outer enclosure 34 and powered by a suitable power supply (not shown) that also powers transceiver modules 24 and the above-referenced electronic system in outer enclosure 34. In FIG. 2, generalized air flows are represented by arrows 38, 40, 42, 44, 46 and 48. The air flows are depicted in generalized form in FIG. 2 in that arrows 38-48 are intended only to convey a general sense of the directions in which air flows with respect to other elements and not to convey any specific type, quantity, strength or other quality or aspect of the flowing air. In some (not necessarily all) embodiments, cooling fan 36 draws air from the exterior of outer enclosure 34 into the interior of outer enclosure 34 (as represented by arrows 38) and directs a flow of air (as represented by arrow 40) toward the rear of module cage 28. Nevertheless, in other embodiments (not shown) such a cooling fan can draw air in a direction opposite that which is described and depicted herein (e.g., expel air from the interior of outer enclosure 34 to the exterior of outer enclosure 34). Note that the direction in which air is depicted in FIG. 2 flowing through outer enclosure 34 is substantially in a direction corresponding to (e.g., parallel to) the longitudinal axes 50 of the various transceiver modules 24 plugged into module cage 28.

Although not shown in the schematic representation of FIG. 2 for purposes of clarity, one or more walls of outer enclosure 34 have apertures or holes (e.g., a grille) through which the airflows represented by arrows 38 can occur. Although similarly not shown in FIG. 2 for purposes of clarity, the air within outer enclosure 34, flowing in the direction described above, enters module bays 26 through similar apertures or holes (e.g., a grille) in the rear wall of module cage 28, as represented by arrows 42.

As described below with regard to a number of exemplary embodiments (i.e., more specific implementations of the exemplary embodiment shown in FIG. 2), air enters each transceiver module 24 and flows through portion of it. Air exits each transceiver module 24 through apertures or holes (not shown in FIG. 2 for purposes of clarity) in one or more of at least three directions: a direction corresponding to (e.g., parallel to) longitudinal axis 50 (as represented by arrows 44); an upward direction substantially transverse to longitudinal axis 50 (as represented by arrow 46); and a downward direction substantially transverse to longitudinal axis 50 (as represented by arrow 48). It should be noted that in some embodiments a transceiver 24 can expel or exhaust air in a certain combination of one or more of these directions, while in other embodiments a transceiver can expel or exhaust air in other combinations of one or more of these directions.

Although the embodiments represented by FIG. 2 include the combination of a module cage 28 and cooling fan 36 within an outer enclosure 34, with the front of module cage 28 mounted in a front panel of outer enclosure 34, other embodiments (not shown) can instead include a structure that combines aspects of module cage 28, cooling fan 36 and outer enclosure 34. For example, in another embodiment a structure similar to module cage 28 but with a cooling fan attached to its rear wall can be provided such that outer enclosure 34 can be omitted. The term "enclosure" as used herein encompasses within its scope of meaning not only the structures described herein but also such alternative structures. Also, unless indicated otherwise in a specific instance, the term "in" is intended to encompass within its scope of meaning both "in" and "on," and the term "on" is intended to encompass within its scope of meaning both "on" and "in." Similarly, the phrase "attached to" and similar connection or attachment phrases also encompass attached or otherwise connected in. For example, unless indicated otherwise, a first element mounted on or attached to a second element in one embodiment can alternatively be mounted in or attached in the second element in another embodiment.

Figure 3:
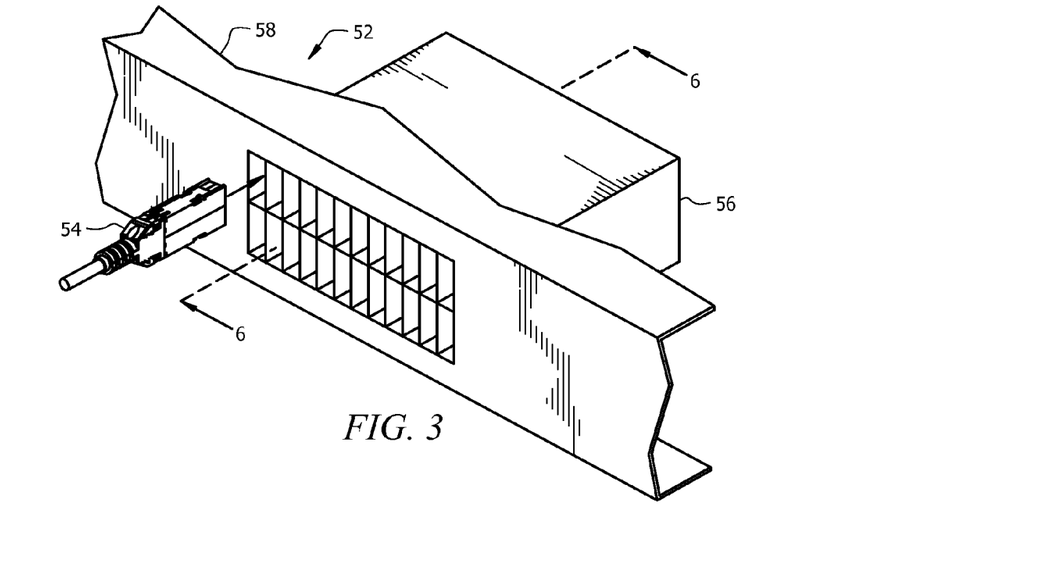
FIG. 3 is a perspective view of an optical transceiver module system in accordance with a first exemplary embodiment of the invention.

As illustrated in FIG. 3, in an exemplary embodiment an optical transceiver module system 52 includes at least one transceiver module 54 and a module cage 56 mounted in a front panel (wall) of an outer enclosure 58. Fan 36 (FIG. 2) is mounted within outer enclosure 58 but not shown in FIG. 3 for purposes of clarity. Although not shown for purposes of clarity, the rear wall of module cage 56 has a grille or array of apertures to admit airflow in the manner described above with regard to FIG. 2. Transceiver module 54 and module cage 56 more specifically embody or implement the generalized transceiver module 24 and module cage 28, respectively, described above with regard to FIG. 2.

Figure 4:
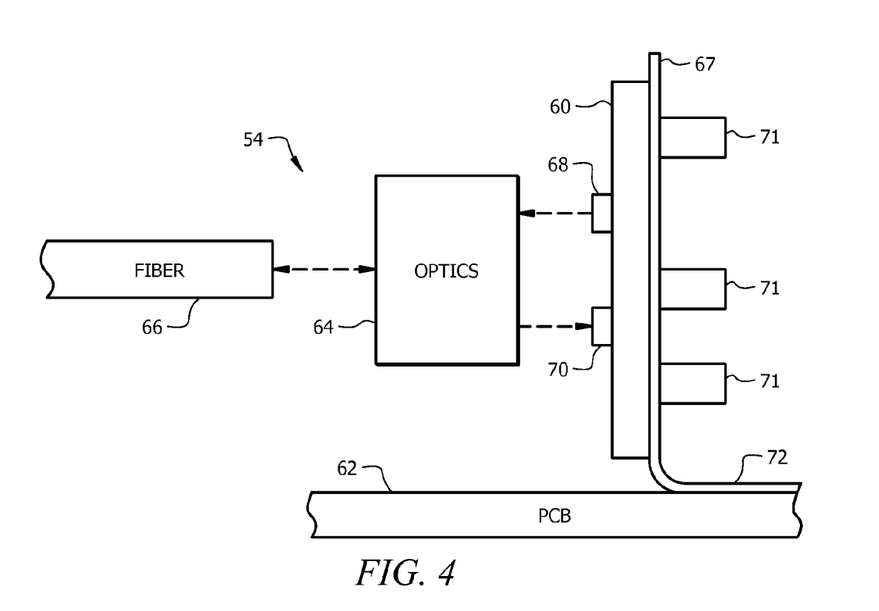
FIG. 4 is a schematic illustration of an optical transceiver module of the system of FIG. 3.

As illustrated in FIG. 4, transceiver module 54 includes an opto-electronic subassembly 60 mounted a printed circuit board (PCB) substrate 62. Opto-electronic subassembly 60 and PCB substrate 62 together define an electronics subassembly. Transceiver module 54 further includes optics 64 and an optical fiber 66. Opto-electronic subassembly 60 includes a TO-can package 67 in which a light source 68, such as a laser, and a light detector 70, such as a photodiode are mounted. Opto-electronic subassembly 60 further includes a flex circuit 72 that couples electrical signals between the TO-can package 67 and PCB substrate 62 via electrical contact pins 71 on the header of TO-can package 67. Optics 64, which can include lenses and reflectors, redirect an optical beam (signal) emitted from light source 70 into an end of optical fiber 66 and redirect an optical beam (signal) emitted from the end of optical fiber 66 onto light detector 70. As persons skilled in the art are capable of providing suitable optics 64, details of optics 64 are not further described herein for purposes of clarity.

Figure 5:
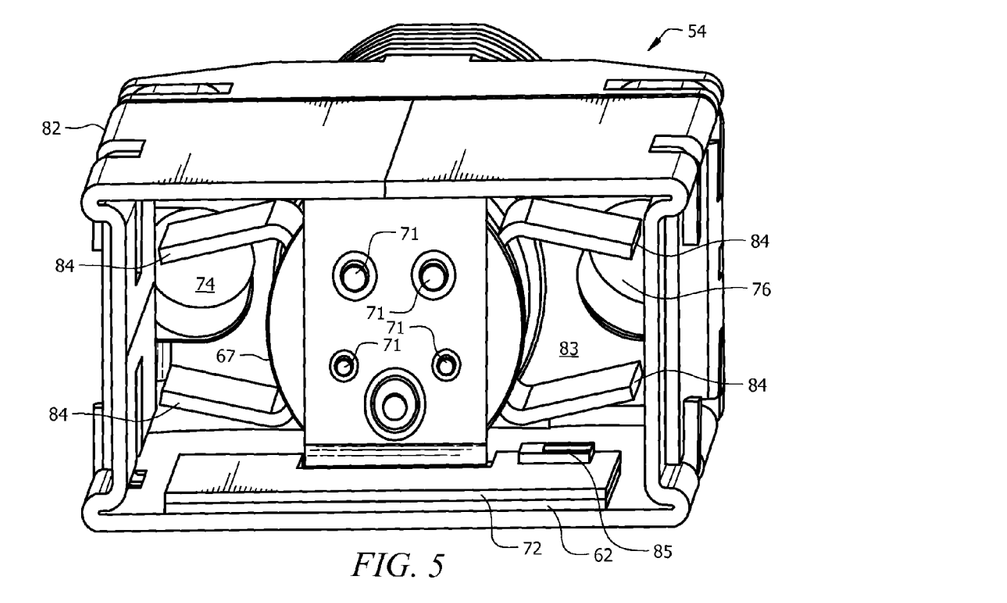
FIG. 5 a rear perspective view of an optical transceiver module of the system of FIG. 3.
Figure 6:
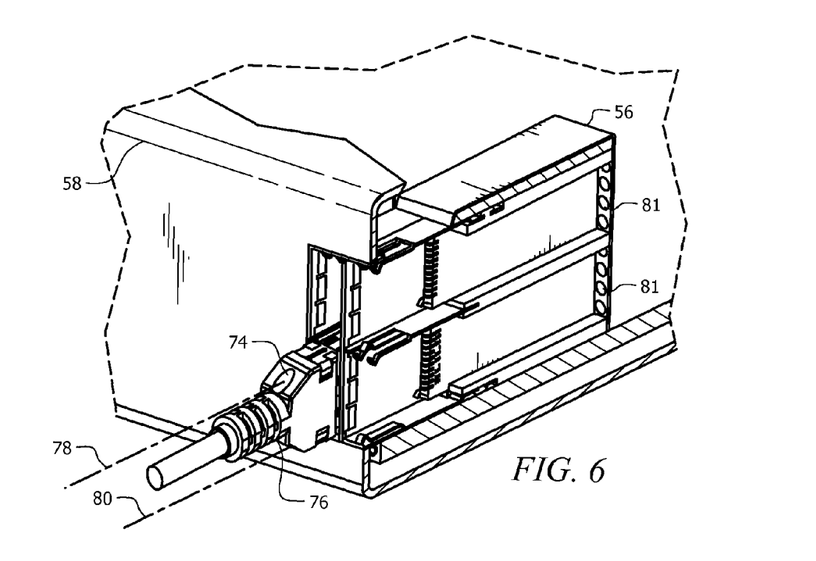
FIG. 6 is a sectional view taken on line 6-6 of FIG. 3.

As illustrated in FIGS. 5-6, the forward or nose end of transceiver module 54 has two openings 74 and 76 aligned along flow axes 78 and 80, respectively. Note that flow axes 78 and 80 are oriented in a direction corresponding to longitudinal axis 50 (FIG. 2). In operation, the airflow enters module cage 56 (FIG. 6) through apertures 81 as described above with regard to FIG. 2. The airflow enters the transceiver module housing assembly 82 (FIG. 5) at the open rear or tail end of transceiver module 54. The walls of transceiver module housing assembly 82 can be made of a suitable metal for mechanical strength and thermal conductivity. The air flows through the interior cavity of transceiver module housing assembly 82 in a direction substantially corresponding to longitudinal axis 50 and exits transceiver module housing assembly 82 through openings 74 and 76. As the air flows through the interior cavity 83 of transceiver module housing assembly 82, the air passes the above-described (FIG. 4) electronics subassembly, including TO-can package 67. The operation of light source 68 (FIG. 4) causes TO-can package 67 to become hot and radiate heat into the surrounding air. The airflow carries away some of this radiated heat and expels it through openings 74 and 76. Heat sinks 84 are attached to TO-can package 67 to facilitate heat transfer to the airflow.

A driver integrated circuit 85 is mounted on a portion of flex circuit 72 that is in turn mounted on PCB substrate 62. As persons skilled in the art understand, driver integrated circuit 85 provides electrical signals to light source 68 in response to signals received from the external electronic system within outer enclosure 58. Heat radiating from driver integrated circuit 85 into the surrounding air is also dissipated from the interior cavity of transceiver module housing assembly 82 by the above-described airflow. In addition, driver integrated circuit 85 is coupled through a thermally conductive path through PCB substrate 62 to the metal walls of transceiver module housing assembly 82, which acts as a heat sink to further facilitate heat transfer to the airflow.

Figure 7:
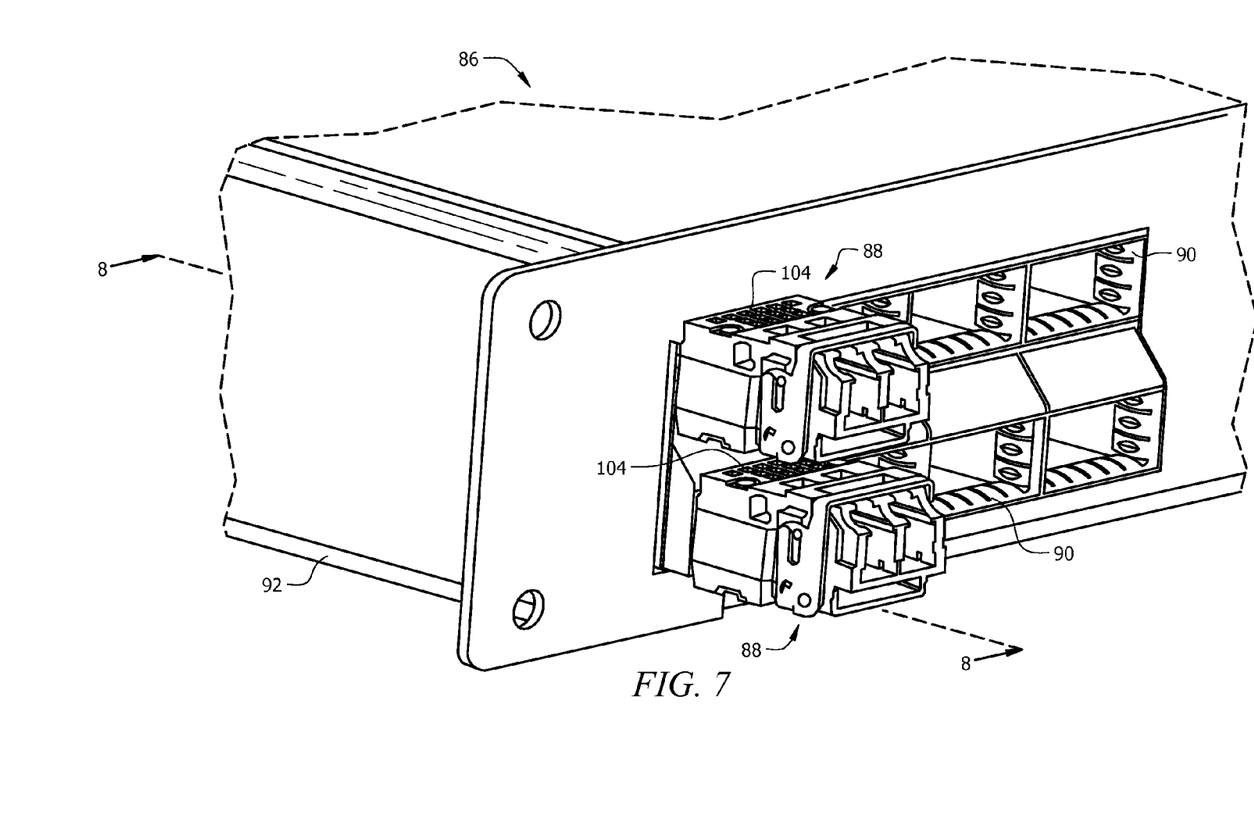
FIG. 7 is a front perspective view of an optical transceiver module system in accordance with a second exemplary embodiment of the invention.
Figure 8:
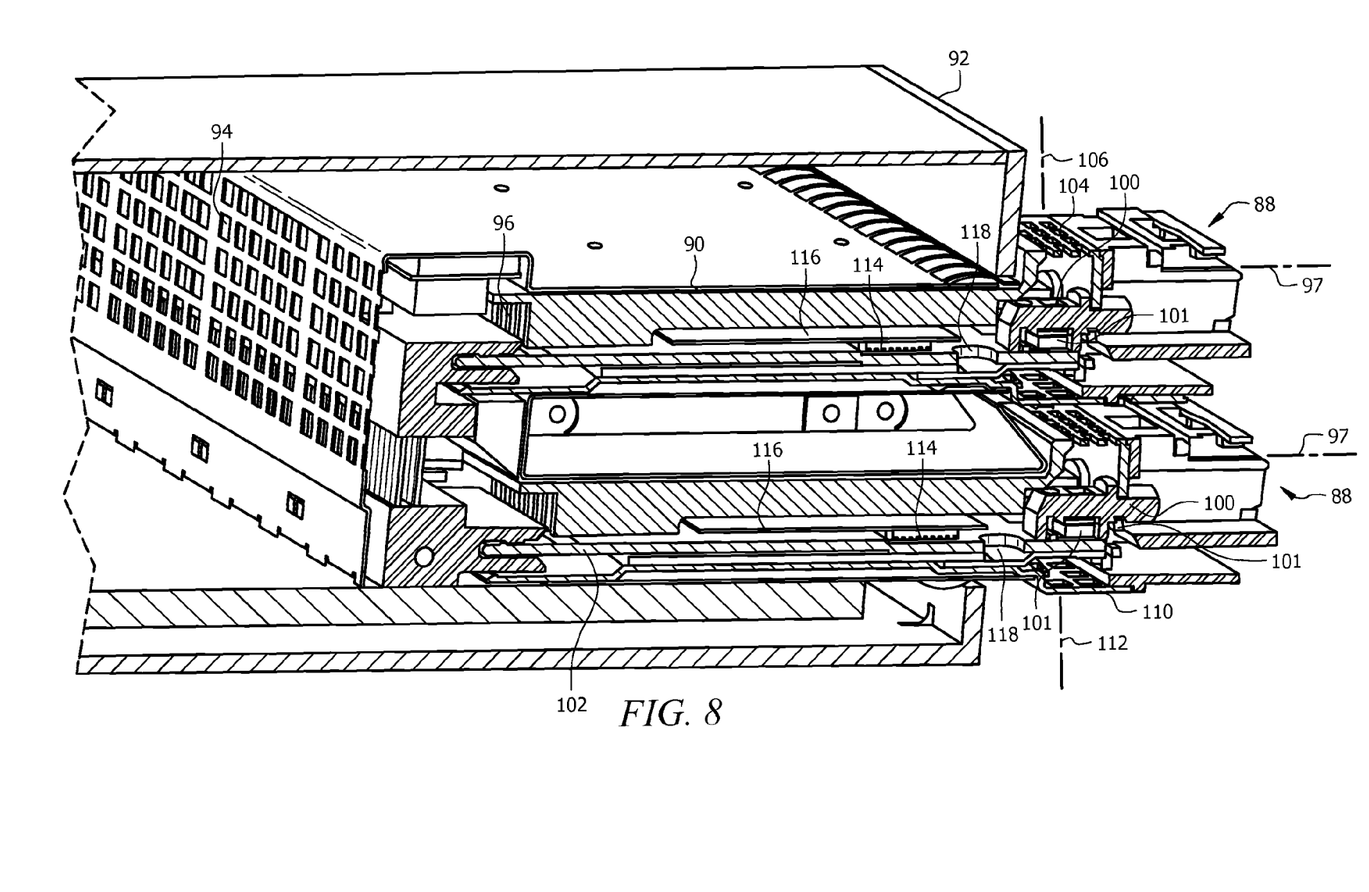
FIG. 8 is a sectional view taken on line 8-8 of FIG. 7.

As illustrated in FIG. 7, in another exemplary embodiment an optical transceiver module system 86 includes at least one transceiver module 88 and a module cage 90 mounted in a front panel (wall) of an outer enclosure 92. Fan 36 (FIG. 2) is mounted within outer enclosure 92 but not shown in FIG. 7 for purposes of clarity. As shown in FIG. 8, the rear wall of module cage 90 has a grille 94 or array of apertures to admit airflow in the manner described above with regard to FIG. 2. Transceiver module 88 and module cage 90 more specifically embody or implement the generalized transceiver module 24 and module cage 28, respectively, described above with regard to FIG. 2.

In operation, the airflow enters module cage 90 (FIG. 8) through grille 94 as described above with regard to FIG. 2. As further illustrated in FIG. 9, the rear or tail end of transceiver module 88 has a grille 96 or array of apertures. The opening defined by grille 96 has an air flow axis aligned in a direction corresponding to the longitudinal axis 97 (FIG. 8). The airflow enters the transceiver module housing assembly 98 through grille 96. The air flows through the interior cavity of transceiver module housing assembly 98 in a direction substantially corresponding to longitudinal axis 97. As the air flows through the interior cavity of transceiver module housing assembly 98, the air passes an electronics subassembly that includes an opto-electronic subassembly 100 mounted on a PCB substrate 102. Opto-electronic subassembly 100 includes a light source 101, such as a laser. The operation of light source 101 causes opto-electronic subassembly 100 to become hot and radiate heat into the surrounding air. The airflow carries away some of this radiated heat and expels it through several openings at the nose end of transceiver module 88 that are oriented in different directions from one another.

Figure 9:
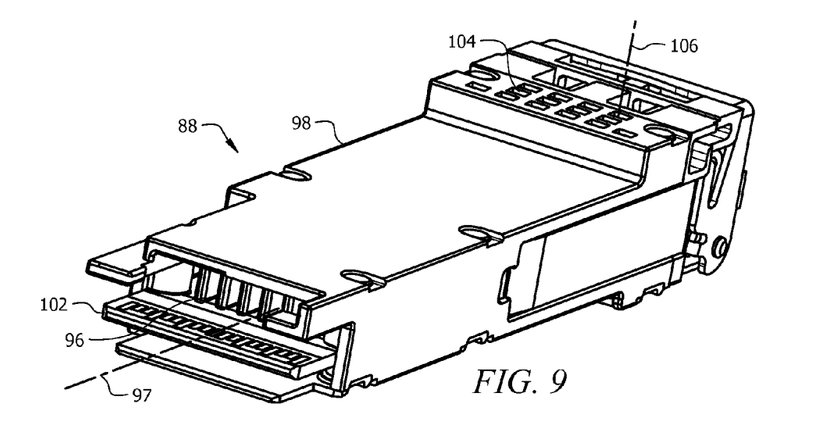
FIG. 9 is a rear perspective view of an optical transceiver module of the system of FIG. 7.

As further illustrated in FIG. 9, one such opening in transceiver module housing assembly 98 from which air is expelled is defined by a grille 104 or array of apertures in the top or upper portion of transceiver module housing assembly 98 at the nose end of transceiver module 88. The opening defined by grille 104 has an air flow axis 106 aligned in a direction transverse to longitudinal axis 97. Air is thus expelled in an upward direction, away from the top or upper portion of transceiver module housing assembly 98.

Figures 10, 11:
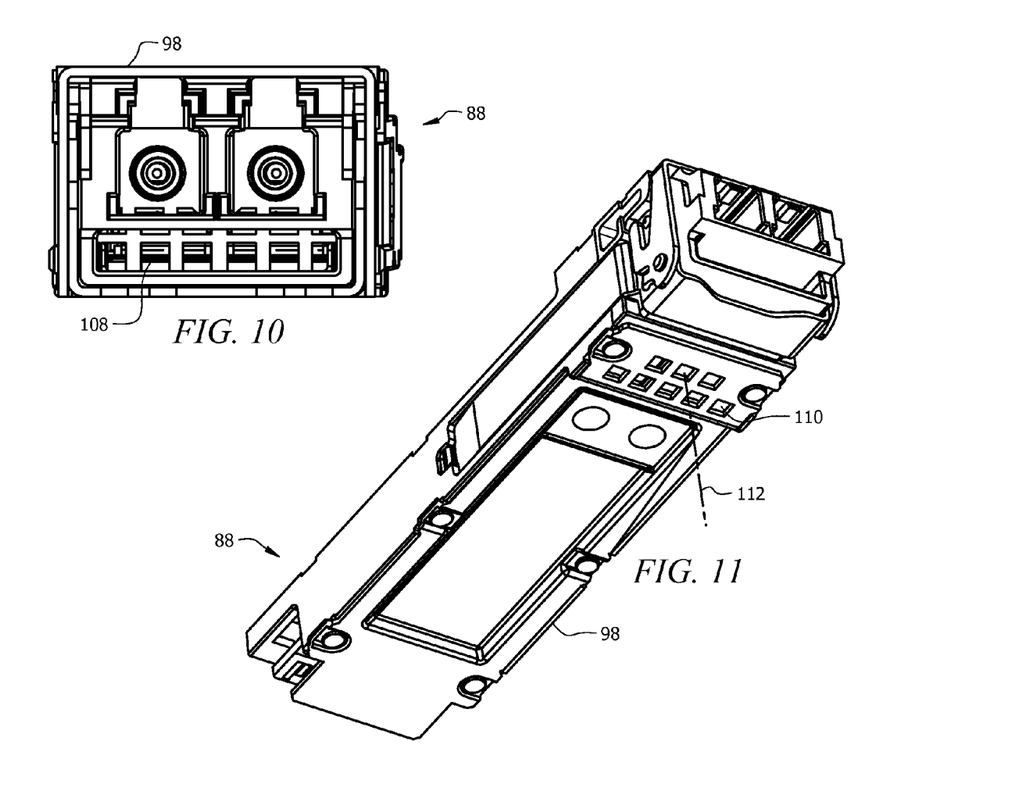
FIG. 10 is a front elevation view of an optical transceiver module of the system of FIG. 7.
FIG. 11 is a bottom perspective view of an optical transceiver module of the system of FIG. 7.

As illustrated in FIG. 10, another such opening in transceiver module housing assembly 98 from which air is expelled is defined by a grille 108 or array of apertures in the front or forward portion of transceiver module housing assembly 98 at the nose end of transceiver module 88. The opening defined by grille 108 has an air flow axis corresponding to longitudinal axis 97. Air is thus expelled in a forward direction, away from the front or forward portion of transceiver module housing assembly 98.

As further illustrated in FIG. 11, yet another such opening in transceiver module housing assembly 98 from which air is expelled is defined by a grille 110 or array of apertures in the bottom or lower portion of transceiver module housing assembly 98 at the nose end of transceiver module 88. The opening defined by grille 110 has an air flow axis 112 aligned in a direction transverse to longitudinal axis 97. Air is thus expelled in a downward direction, away from the bottom or lower portion of transceiver module housing assembly 98.

Referring again to FIG. 8, a driver integrated circuit 114 is mounted on PCB substrate 102. As persons skilled in the art understand, driver integrated circuit 114 provides electrical signals to the light source of opto-electronic subassembly 100 in response to signals received from the external electronic system within outer enclosure 92. Heat radiating from driver integrated circuit 114 into the surrounding air is also dissipated from the interior cavity of transceiver module housing assembly 98 by the above-described airflow. A heat sink 116 attached to the top of driver integrated circuit 114 facilitates heat transfer to the airflow.

An opening or aperture 118 in PCB substrate 102 allows some air to flow from a first side of PCB substrate 102 to a second side of PCB substrate 102. It is this airflow that exits transceiver module housing assembly 98 through grille 110 (FIG. 11). Driver integrated circuit 114 is coupled through a thermally conductive path through PCB substrate 102 to the metal lower wall of transceiver module housing assembly 98 (including grille 110), which acts as a heat sink to further facilitate heat transfer to the airflow. Thus, the airflow that crosses to the second side of PCB substrate 102 primarily serves to dissipate heat generated by driver integrated circuit 114, while the airflows that remain on the first side of PCB substrate 102 primarily serve to dissipate heat generated by light source 101.

Figure 12:
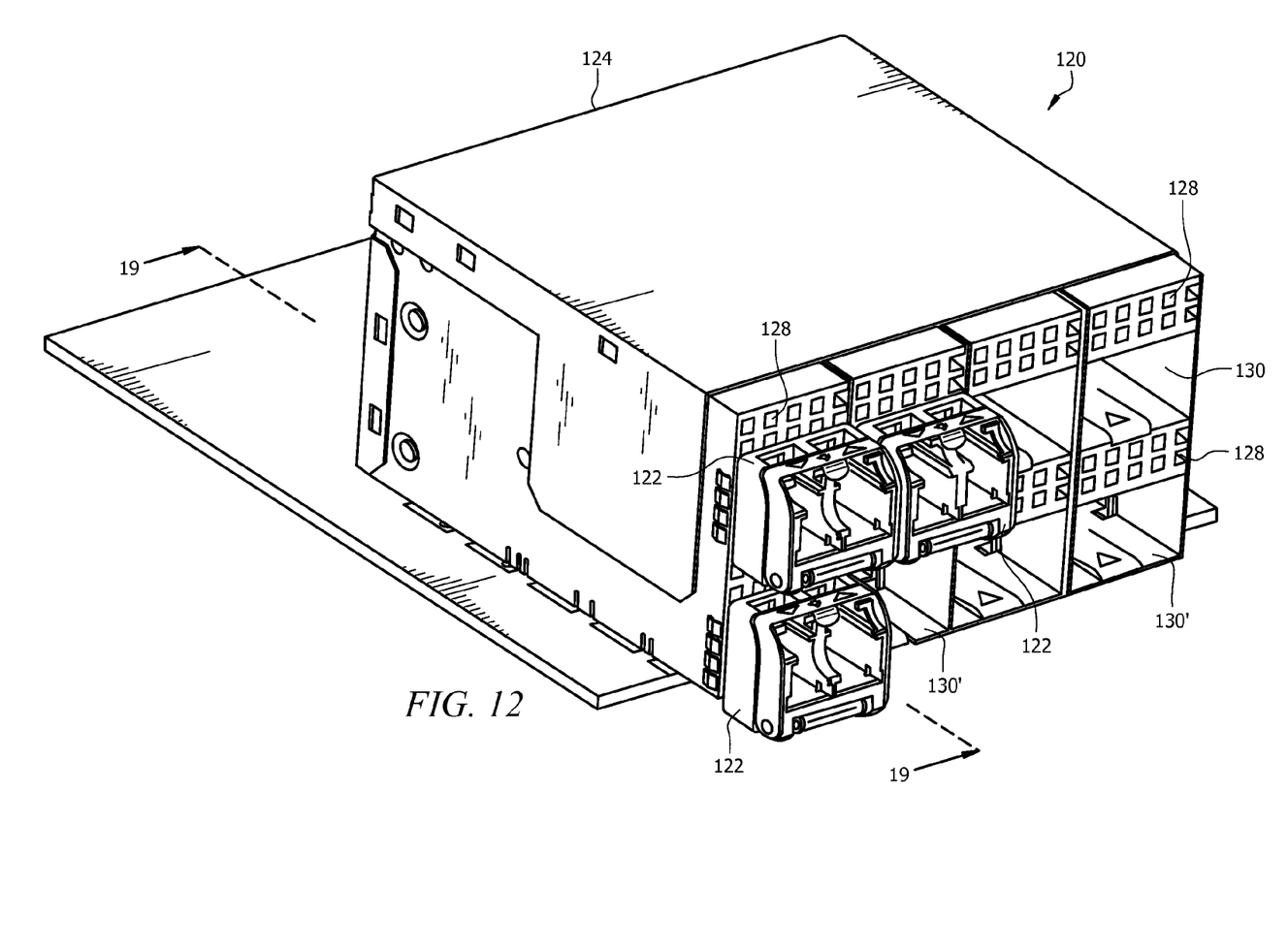
FIG. 12 is a front perspective view of an optical transceiver module system in accordance with a third exemplary embodiment of the invention.

As illustrated in FIG. 12, in yet another exemplary embodiment an optical transceiver module system 120 includes at least one transceiver module 122 and a module cage 124. Although not shown in FIG. 12 for purposes of clarity, as in the other embodiments fan 36 (FIG. 2) is mounted within an outer enclosure in which module cage 124 is mounted. As shown in FIG. 12, the front wall of module cage 124 has a grille 128 or array of apertures immediately above each module bay 130.

Figure 13:
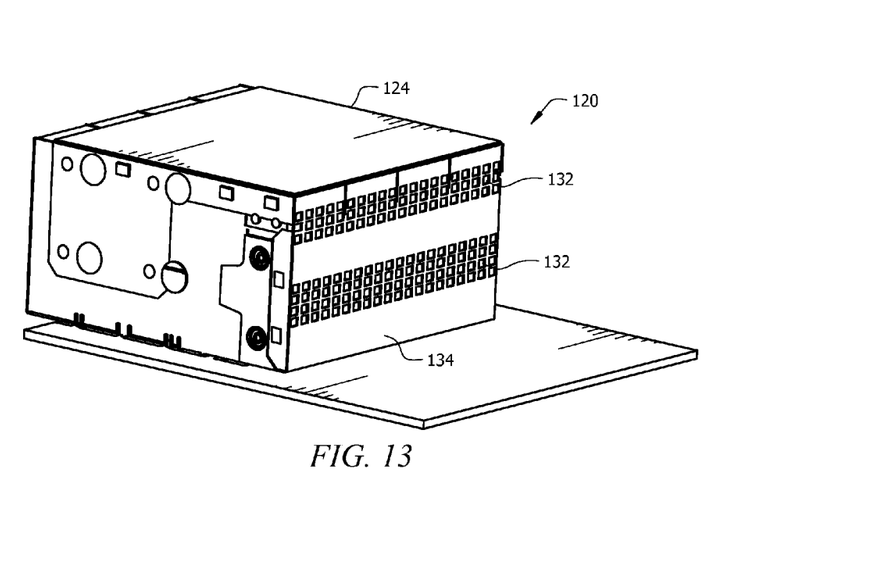
FIG. 13 is a rear perspective view of the optical transceiver module system of FIG. 12.

As illustrated in FIG. 13, the rear wall of module cage 124 has a grille 132 or array of apertures in a rear wall 134 to admit airflow in the manner described above with regard to FIG. 2. Transceiver module 122 (FIG. 12) and module cage 124 more specifically embody or implement the generalized transceiver module 24 and module cage 28, respectively, described above with regard to FIG. 2.

Figure 14:
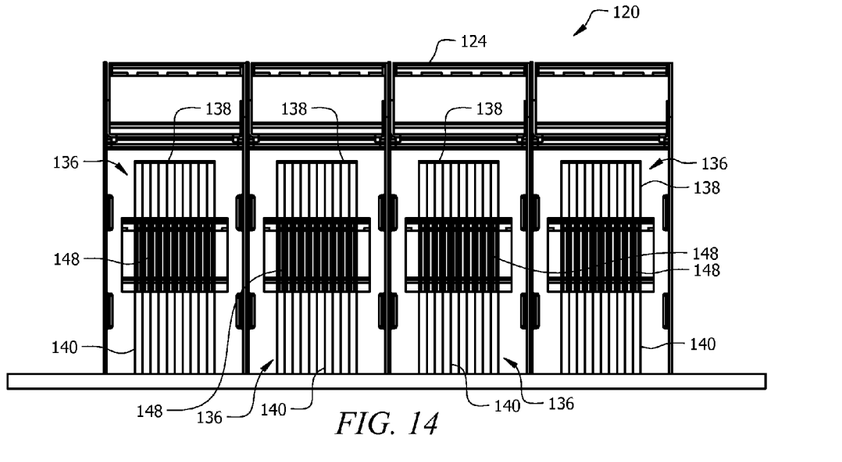
FIG. 14 is rear elevation view of the module cage of the system of FIG. 13, with the rear wall of the module cage removed to reveal the interior.
Figure 15:
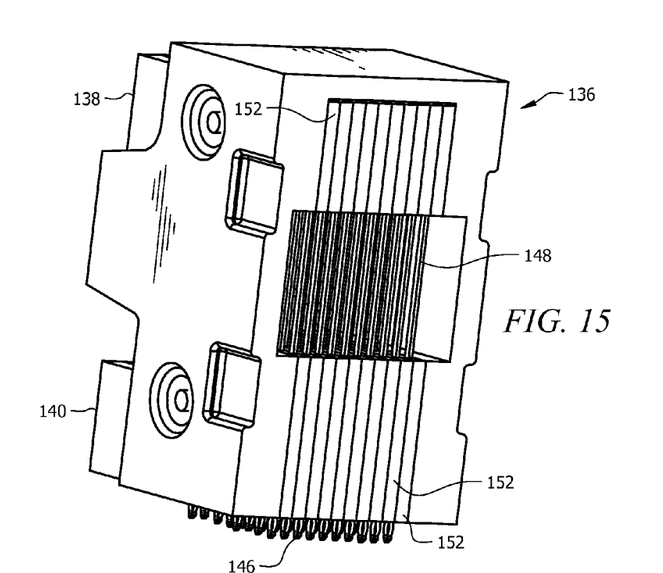
FIG. 15 is a rear perspective view of a module bay electrical connector of the module cage of FIG. 14.
Figure 16:
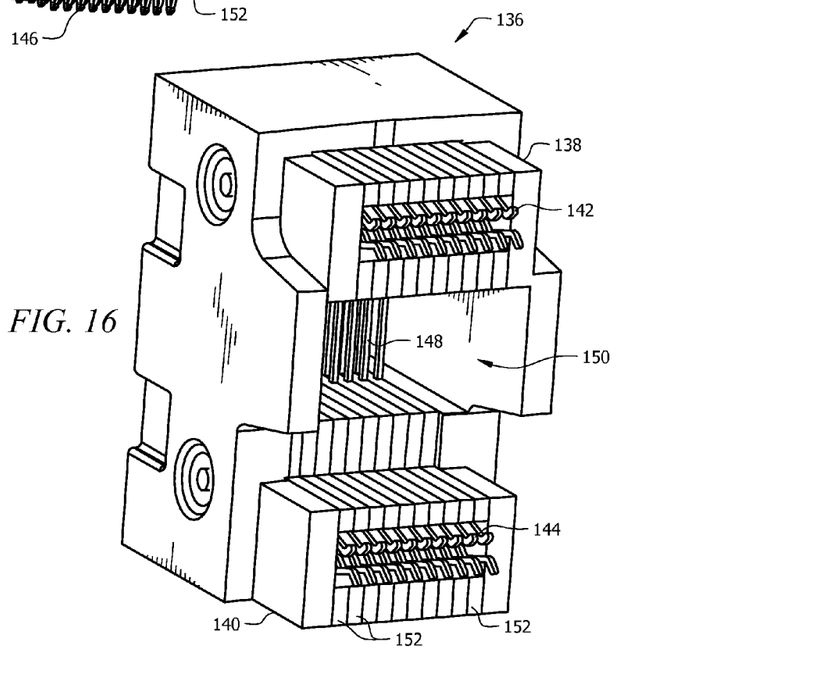
FIG. 16 is a front perspective view of a module bay electrical connector of the module cage of FIG. 14.

As illustrated in FIG. 14, a number of connectors 136 are arrayed along the rear wall 134 (removed in FIG. 14 to reveal the interior of module cage 124). As further illustrated in FIGS. 15-16, each connector 136 comprises an upper connector 138 and a lower connector 140. Referring again to FIG. 12, when a transceiver 122 is plugged into a module bay 130 of an upper row of module bays 130, the tail end of transceiver 122 is received in upper connector 138. Likewise, when a transceiver 122 is plugged into a module bay 130' of a lower row of module bays 130, the tail end of transceiver 122 is received in lower connector 140. Upper and lower connectors 138 and 140 include spring finger arrays 142 and 144 (FIG. 16), respectively, which mate with conductive pads at the tail end of transceiver 122.

Spring finger arrays 142 and 144 and a contact pin array 146 (FIG. 15) define opposing ends of an array of electrical conductors. Portions of this array of electrical conductors, such as portions of spring finger arrays 142 and 144 and contact pin array 146, are embedded in a material (e.g., plastic) from which connector 136 is primarily made. However, an exposed section or conductor portion 148 of this array of electrical conductors between upper connector 138 and lower connector 140 is exposed in an opening 150 (FIG. 16) in connector 136. That is, opening 150 extends between the front and rear of connector 136, and the exposed conductor portion 148 spans opening 150 from one of its edges to an opposite edge. Note that air can flow relatively unimpeded between the front and rear of connector 136 through the interstitial spaces (between adjacent conductors) of exposed conductor portion 148 where the conductors span opening 150 and thus flow through opening 150.

Figure 17:
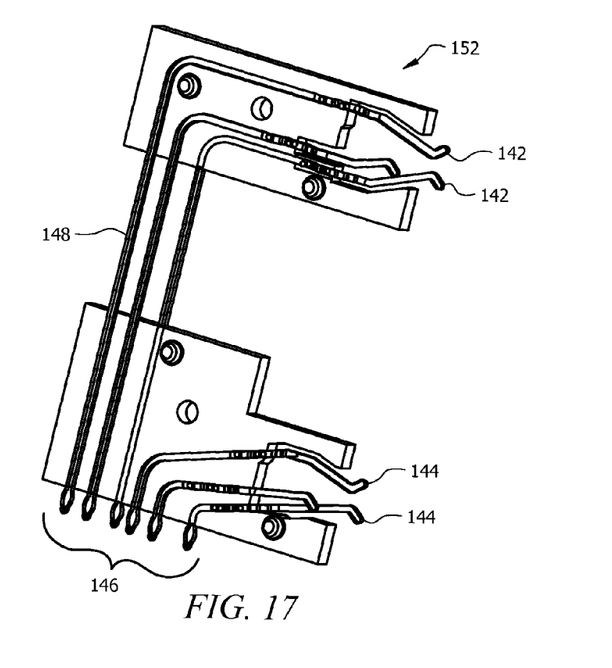
FIG. 17 is a front perspective view of one of the plurality of connector slices of the module bay electrical connector of FIG. 16.

As illustrated in FIG. 17, portions of spring finger arrays 142 and 144 and contact pin array 146 are embedded in a material such as plastic to define a planar connector structure 152. In forming connector 136, planar connector structures 152 are stacked next to each other like books on a shelf.

Figure 18:
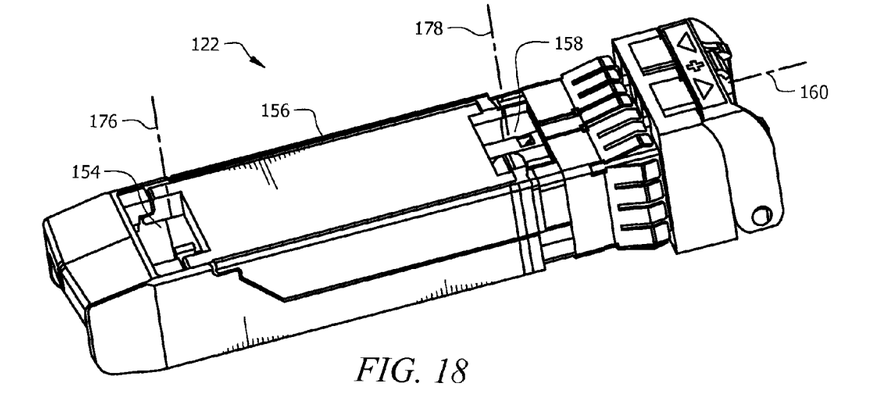
FIG. 18 is a perspective view of a transceiver of the optical transceiver module system of FIG. 12.

In operation, the airflow enters module cage 124 (FIGS. 13 and 19) through grille 132 in the manner described above. As illustrated in FIG. 18, transceiver module 122 has a first opening 154 in the upper wall of the transceiver module housing assembly 156 at the rear or tail end of transceiver module 122 and a second opening 158 in the upper wall of transceiver module housing assembly 156 at the front or nose end of transceiver module 122. The airflow enters transceiver module housing assembly 156 through first opening 154. As indicated by arrows in FIG. 19, the air flows through the interior cavity 159 of transceiver module housing assembly 156 in a direction substantially corresponding to the longitudinal axis 160. As the air flows through interior cavity 159, the air passes an electronics subassembly that includes an opto-electronic subassembly 162 mounted on a PCB substrate 164.

Figure 19:
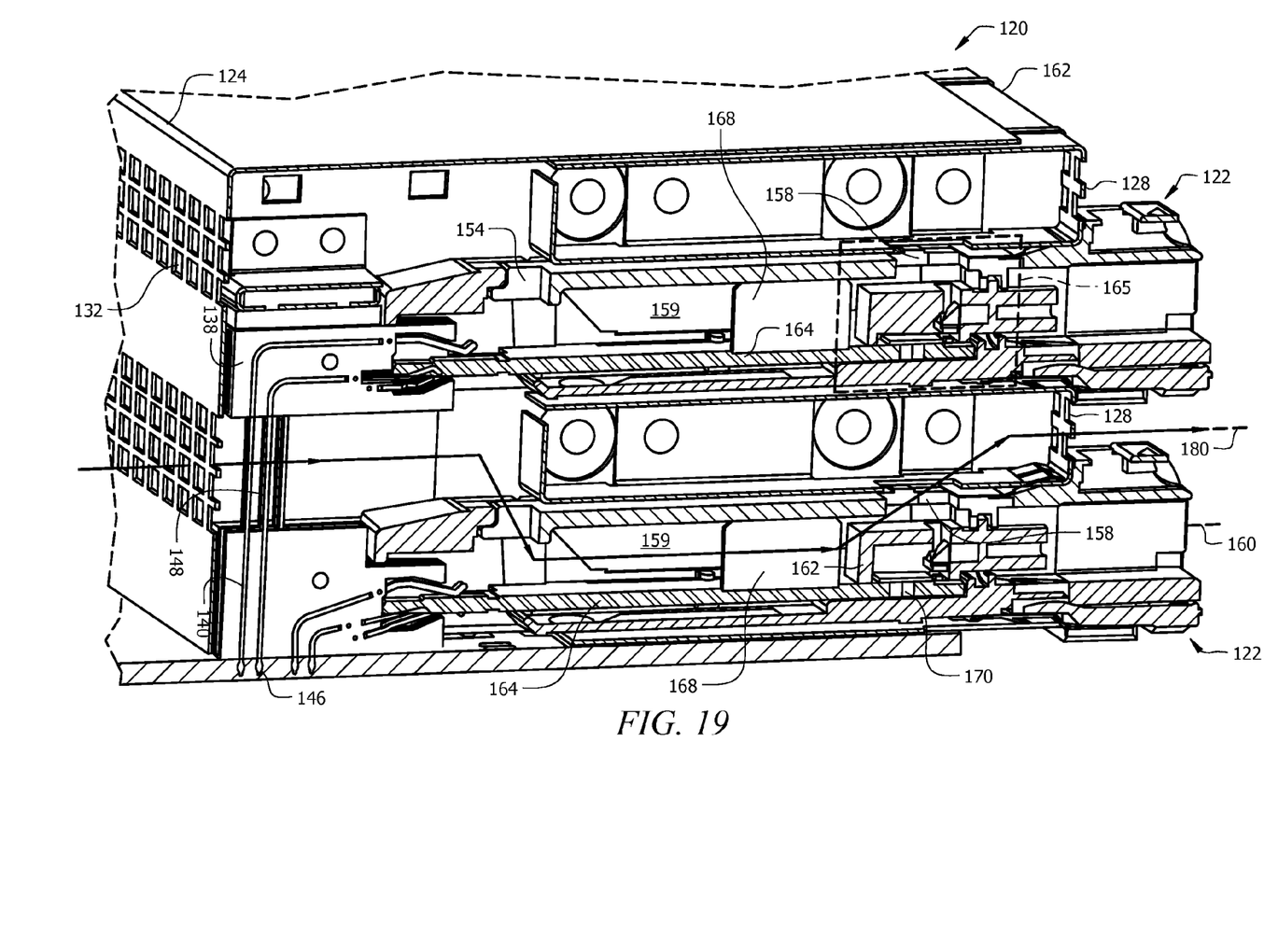
FIG. 19 is a sectional view taken on line 18-18 of FIG. 12.
Figure 20:
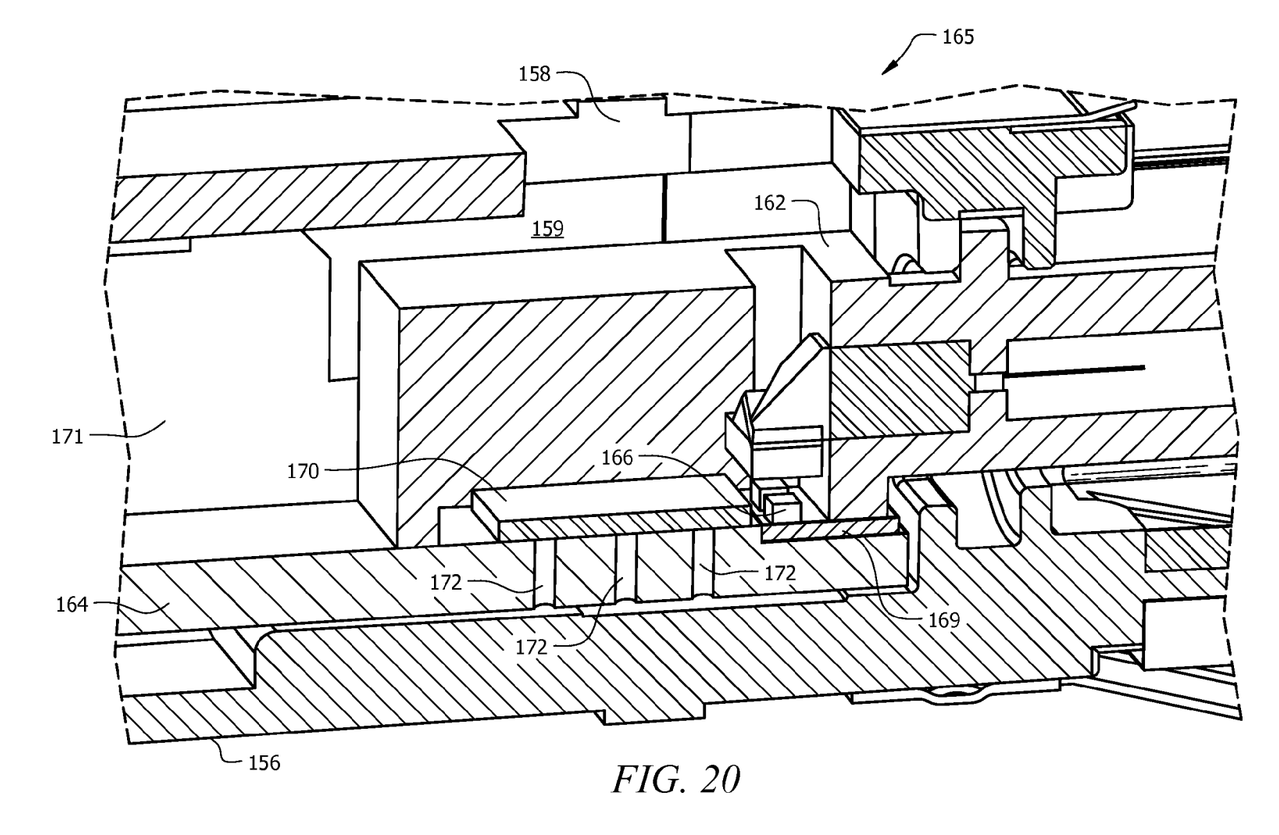
FIG. 20 is an enlargement of a portion of FIG. 19.

An enlarged portion 165 of FIG. 19 is shown in FIG. 20. Opto-electronic subassembly 162 includes a light source 166, such as a laser. The operation of light source 166 causes it to generate heat. Light source 166 is coupled through a thermally conductive path to a heat sink 168. Light source 166 is mounted on a forward portion 169 of heat sink 168 beneath opto-electronic subassembly 162. A rearward portion 171 of heat sink 168 is mounted within interior cavity 159 on PCB substrate 164 rearward of opto-electronic subassembly 162. In operation, heat generated by light source 166 is conducted from forward portion 169 of heat sink 168 to rearward portion 171 of heat sink 168. The incoming air flows past rearward portion 171 of heat sink 168. The airflow carries away some of the heat radiated by heat sink 168 and expels it through second opening 158 at the nose end of transceiver module 122. Note in FIG. 18 that first and second openings 154 and 158 have flow axes 176 and 178, respectively, oriented transversely to longitudinal axis 160. After exiting transceiver module housing assembly 156 through second opening 158, the air flows out of module cage 124 through grating 128, which has a flow axis 180 (FIG. 19).

Returning to FIG. 20, a driver integrated circuit 170 within opto-electronic subassembly 162 is mounted on and electrically connected to PCB substrate 164 (electrical connections are not shown for purposes of clarity). A number of thermal vias 172 (i.e., thermally conductive plated through-holes) in PCB substrate 164 conduct heat from driver integrated circuit 170 to the lower wall of transceiver module housing assembly 156. As transceiver module housing assembly 156, serves as a heat sink by radiating the heat generated by driver integrated circuit 170 to the environment outside transceiver module housing assembly 156. It can be noted that in this embodiment there are two thermal paths: a first path in which heat generated by light source 166 is radiated by heat sink 168 and carried out of transceiver module housing assembly 156 by the airflow; and a second path in which heat generated by driver integrated circuit 170 is conducted to transceiver module housing assembly 156 and radiated to the exterior environment. Providing separate thermal paths for light source 166 and driver integrated circuit 170 can be advantageous because it allows driver integrated circuit 170 to operate at a higher temperature than light source 166. Driver integrated circuit 170 commonly generates much more heat than light source 166 (e.g., a VCSEL) and is more tolerant of excess heat than light source 166. Providing two separate thermal paths for light source 166 and driver integrated circuit 170 inhibits the excess heat generated by driver integrated circuit 170 from adversely affecting the operation of light source 166.

One or more illustrative embodiments of the invention have been described above. However, it is to be understood that the invention is defined by the appended claims and is not limited to the specific embodiments described.

What is claimed is:

1. An optical transceiver module system, comprising:
an enclosure having a plurality of bays, each bay having an elongated rectangular receptacle shape extending substantially along a longitudinal axis, each bay having a bay electrical connector;
a cooling fan in the enclosure configured to convey air in a direction corresponding to the longitudinal axis;
a transceiver module plugged into one of the bays, the transceiver module having a nose end and a tail end and extending between the nose end and the tail end in a direction corresponding to the longitudinal axis, the transceiver module comprising:
an electronics subassembly comprising a heat-emitting light source, a heat-emitting electronic device and a substrate having the light source and electronic device mounted thereon, the substrate having a plurality of signal conductors and a generally planar shape elongated in the direction corresponding to the longitudinal axis, the electronics subassembly mated with the bay electrical connector of the one of the bays into which the transceiver module is plugged;
an elongated rectangular transceiver module housing assembly having a shape corresponding to the receptacle shape of the bay to provide a slideable fit with the bay, the transceiver module housing assembly extending between the nose end and the tail end of the transceiver module and having at least one optical receptacle disposed at the nose end of the transceiver module housing assembly for receiving a fiber-optic cable plug connector, the transceiver module housing assembly having a first airflow opening and a second airflow opening separated by an interior cavity portion of the transceiver module housing assembly extending in a direction corresponding to the longitudinal axis, wherein the light source is mounted in the interior cavity portion of the transceiver module housing assembly between the first airflow opening and the second airflow opening; and
an optics subsystem in the transceiver module housing assembly configured to redirect an optical beam between the light source and the optical receptacle.

2. The optical transceiver module system of claim 1, wherein one of the first and second airflow openings is disposed at the nose end of the transceiver module and has a flow axis oriented in a direction corresponding to the longitudinal axis.

3. The optical transceiver module system of claim 2, wherein the electronics subassembly comprises an opto-electronics subassembly mounted to the substrate, an optical axis of the light source oriented in a direction corresponding to the longitudinal axis, and further comprising a heat sink attached to the opto-electronics assembly and disposed along the flow axis of the one of the first and second airflow openings.

4. The optical transceiver module system of claim 3, wherein the opto-electronics subassembly comprises a printed circuit board, a TO-can package in which the light source is mounted, and a flex circuit, the flex circuit coupling signals between the TO-can package and the printed circuit board.

5. The optical transceiver module system of claim 4, further comprising a driver integrated circuit electrically coupled to the light source and to at least a portion of the signal conductors, the driver integrated circuit coupled to a surface of the printed circuit board and disposed along the flow axis of the one of the first and second airflow openings.

6. The optical transceiver module system of claim 1, wherein the nose end of the transceiver module is disposed outside the enclosure when the transceiver module is fully plugged into the one of the bays, and one of the first and second airflow openings is disposed outside the enclosure and has a flow axis oriented in a direction corresponding to the longitudinal axis.

7. The optical transceiver module system of claim 6, wherein the nose end of the transceiver module comprises a metal portion of the transceiver module housing assembly having the one of the first and second airflow openings, and a plastic portion having the optical receptacle forward of the metal portion.

8. The optical transceiver module system of claim 1, wherein the nose end of the transceiver module is disposed outside the enclosure when the transceiver module is fully plugged into the one of the bays, and one of the first and second airflow openings is disposed outside the enclosure and has a flow axis oriented in a direction transverse to the longitudinal axis.

9. The optical transceiver module system of claim 8, wherein the nose end of the transceiver module comprises a metal portion of the transceiver module housing assembly having the one of the first and second airflow openings, and a plastic portion having the optical receptacle forward of the metal portion.

10. The optical transceiver module system of claim 9, wherein the substrate has an aperture between an upper side of the substrate and a lower side of the substrate, and the first and second airflow openings are disposed on opposite sides of the substrate.

11. The optical transceiver module system of claim 10, further comprising a driver integrated circuit coupled through a thermally conductive path to the metal portion of the transceiver module housing assembly.

12. The optical transceiver module system of claim 1, wherein the enclosure comprises a plurality of front panel openings, each front panel opening adjacent to one of the bays and adjacent to the nose end of the transceiver module when the transceiver module is fully plugged into the one of the bays, the enclosure providing an air flow passage between one of the first and second airflow openings and the front panel opening when the transceiver module is fully plugged into the one of the bays.

13. The optical transceiver module system of claim 1, wherein the bay electrical connector comprises an upper connector having a housing in which upper connector fingers are enclosed, a lower connector having a housing in which lower connector fingers are enclosed, and exposed electrical signal conductors extending between the upper connector and lower connector in a direction transverse to the direction corresponding to the longitudinal axis, the exposed electrical signal conductors defining an air flow passage to one of the first and second airflow openings when the transceiver module is fully plugged into the one of the bays.

14. The optical transceiver module system of claim 1, further comprising a driver integrated circuit coupled through a thermally conductive path to the metal portion of the transceiver module housing assembly.

* * * * *